United States Patent [19]

Paul et al.

[11] Patent Number: 5,375,560
[45] Date of Patent: Dec. 27, 1994

[54] HEAD GATE ASSEMBLY

[75] Inventors: John Paul; Adrian J. Paul, both of Duncan, Okla.

[73] Assignee: Adrian J. Paul Company, Duncan, Okla.

[21] Appl. No.: 20,503

[22] Filed: Feb. 22, 1993

Related U.S. Application Data

[63] Continuation-in-part of Ser. No. 975,030, Nov. 12, 1992, Pat. No. 5,230,395, which is a continuation of Ser. No. 731,558, Jul. 17, 1991, Pat. No. 5,205,370.

[51] Int. Cl.$^5$ ............................................. A61D 3/00
[52] U.S. Cl. .................................................. 119/734
[58] Field of Search ............... 119/722, 723, 731, 734, 119/737, 738, 739, 732

[56] References Cited

U.S. PATENT DOCUMENTS

| | | | |
|---|---|---|---|
| 3,691,998 | 9/1972 | Luinstra | 119/737 X |
| 4,050,532 | 9/1977 | Provi et al. | 177/211 |
| 4,100,886 | 7/1978 | Wade et al. | 119/730 |
| 4,517,924 | 5/1985 | McCan et al. | 119/734 |
| 4,836,304 | 6/1989 | Paul | 177/185 |

OTHER PUBLICATIONS

Brochure entitled "Kevlar ®, The Uncommon Material for . . . ".
Brochure entitled "Kevlar ®, When Your Elastomeric Application . . . ".
Brochure entitled "Kevlar ® In Conveyor Belts".
Brochure entitled "Presenting Kevlar ® 119 Aramid Fiber . . . ".

*Primary Examiner*—Robert P. Swiatek
*Attorney, Agent, or Firm*—Dunlap, Codding & Lee

[57] ABSTRACT

An animal head gate having a base with a first and a second rod pivotally supported on the base. First and second gates are connected to the respective first and second rods. The first and the second gates each have an open position and a closed position. In the closed position of the first and the second gates, portions of the first and the second gates extend about a portion of the animal for restraining movement of the animal. An actuator assembly is connected to the first and the second rods for causing the second rod to rotate in a closing direction and in an opening direction in response to the first rod being moved in the closing direction and in the opening direction. The actuator assembly comprises a strap having a square or rectangularly shaped cross section with a substantially flat upper surface and a substantially flat lower surface, the strap comprising a plurality of individual strands woven and interconnected to form the strap.

13 Claims, 3 Drawing Sheets

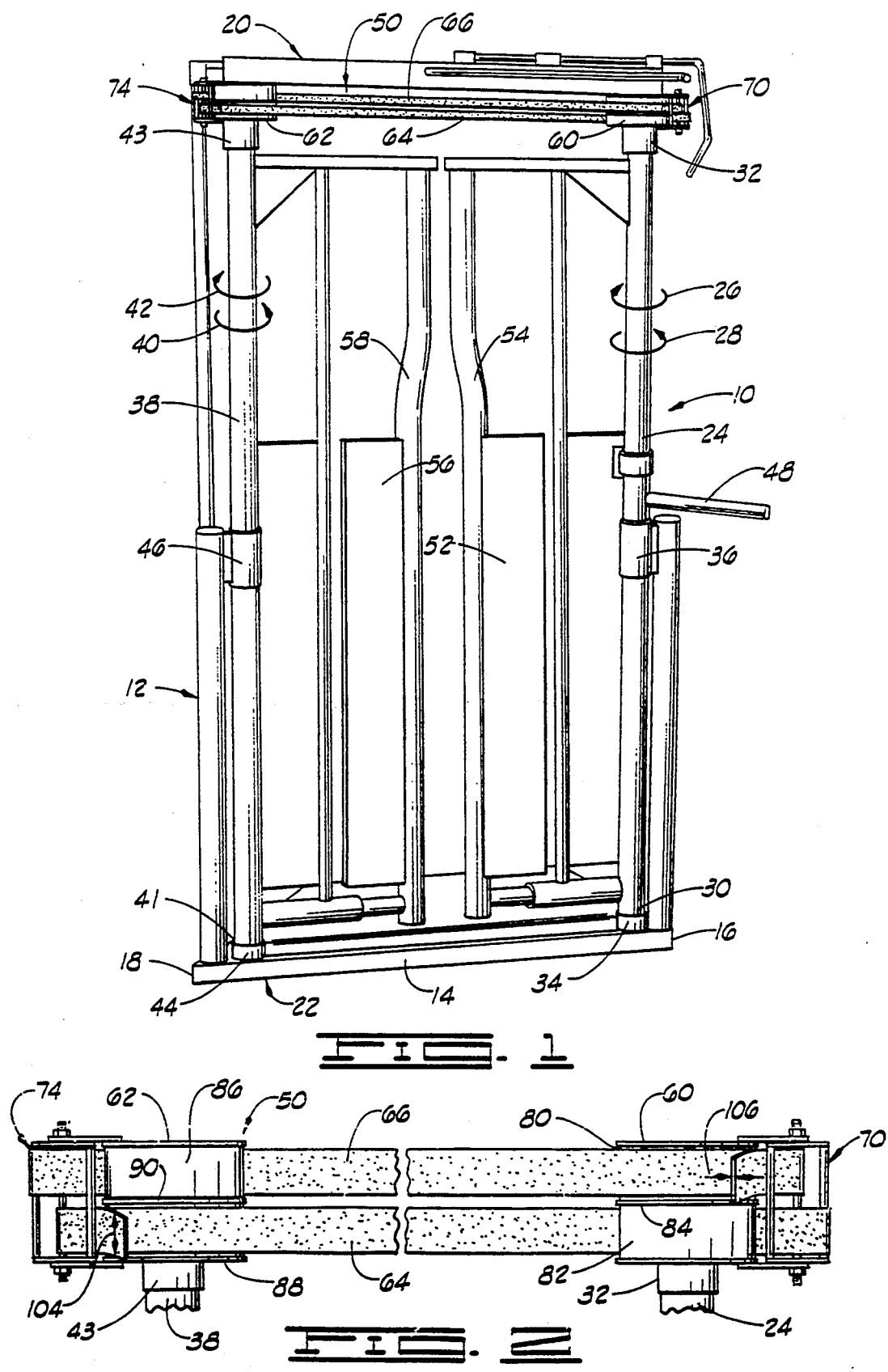

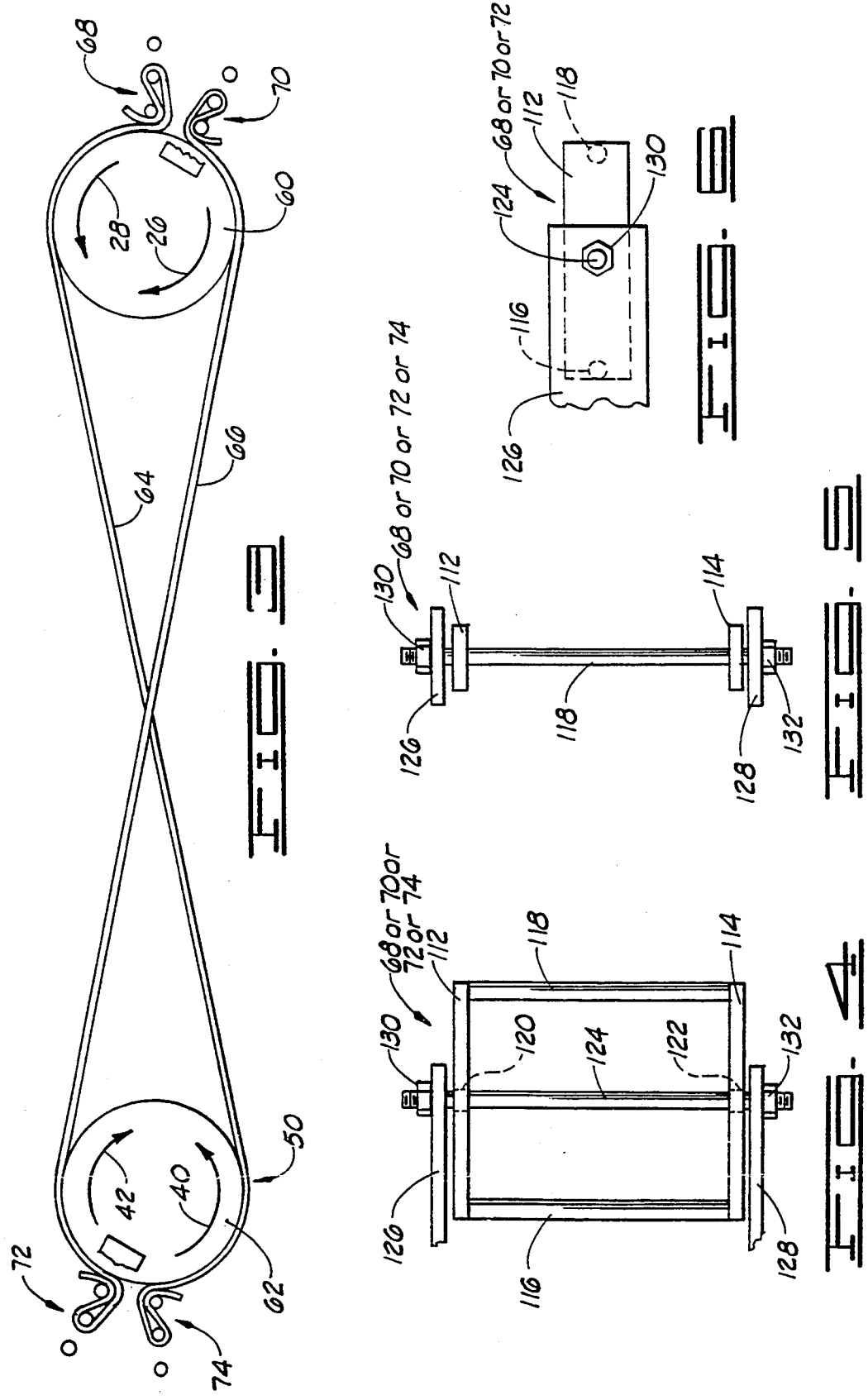

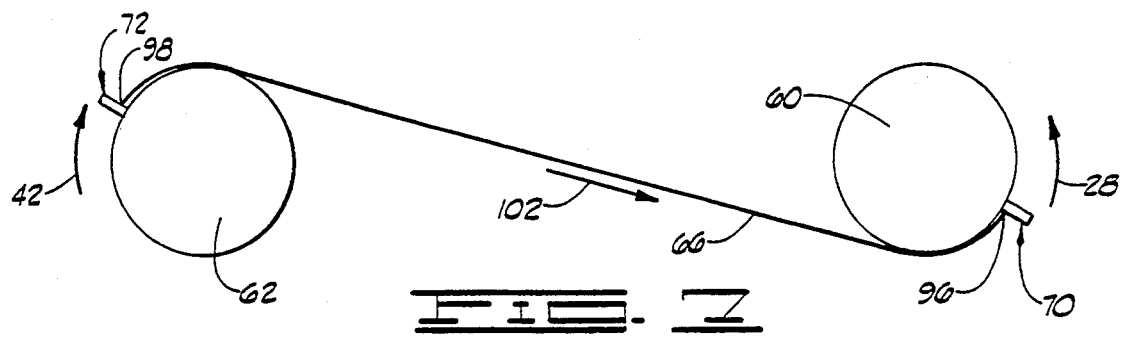
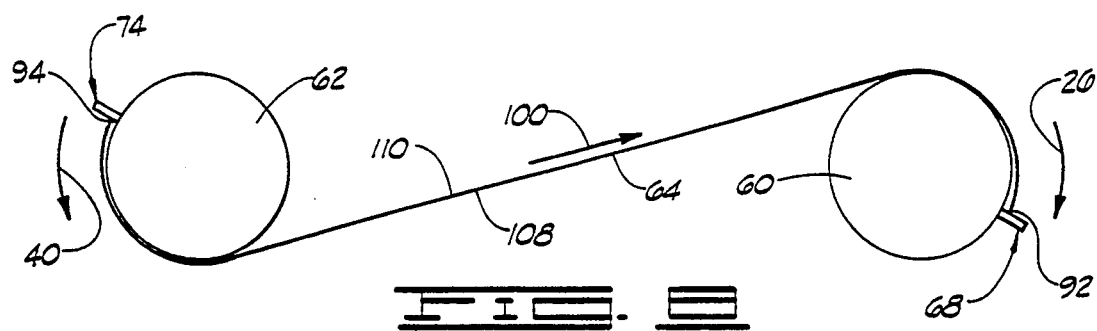
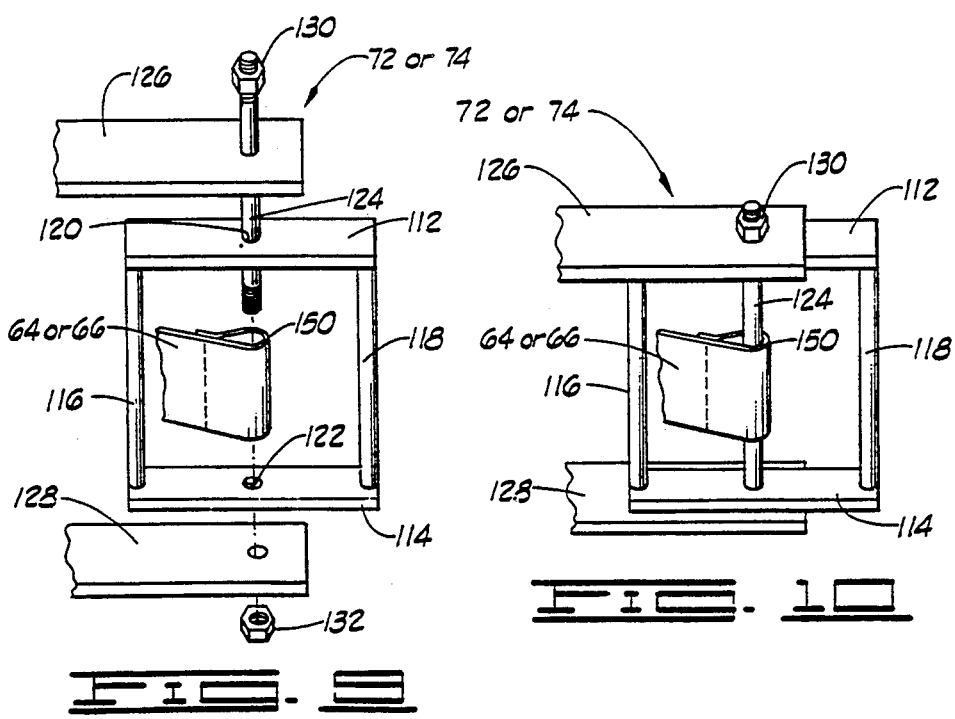

HEAD GATE ASSEMBLY

RELATED REFERENCES

This application is a continuation-in-part of U.S. Ser. No. 07/975,030, filed Nov. 12, 1992 now U.S. Pat. No. 5,230,395, which is a continuation of U.S. Ser. No. 07/731,558 filed Jul. 17, 1991, now U.S. Pat. No. 5,205,370.

FIELD OF THE INVENTION

The present invention relates generally to animal head gates and, more particularly, but not by way of limitation, to an animal head gate having a first and a second gate moveable to opened and closed positions, an actuator assembly connecting the first and the second gates for causing the second gate to rotate in the closing direction and in the opening direction in response to the first gate being moved in the closing direction and the opening direction respectively wherein the actuator assembly comprises a strap having a square or rectangularly shaped cross section with a substantially flat upper surface and a substantially flat lower surface, the strap comprising a plurality of individual strands woven and interconnected to form the strap.

BRIEF DESCRIPTION OF THE DRAWINGS

FIG. 1 is a partial perspective view of an animal head gate assembly constructed in accordance with the present invention showing the first and the second gates in a closed position.

FIG. 2 is an enlarged view of the upper portion of the animal head gate of FIG. 1 showing in greater detail the actuator assembly portion thereof.

FIG. 3 is a top elevational view of the actuator assembly.

FIG. 4 is a front elevational view of a typical clamp assembly.

FIG. 5 is an end elevational view of the typical clamp assembly of FIG. 4.

FIG. 6 is a top elevational view of the typical clamp assembly of FIGS. 4 and 5.

FIG. 7 is a schematic view illustrating one aspect of the operation of the actuator assembly.

FIG. 8 is a schematic view, similar to FIG. 7, but illustrating a different aspect of the operation of the actuator assembly.

FIG. 9 is an exploded view of a modified typical clamp assembly.

FIG. 10 is a view of the modified clamp assembly of FIG. 9, but showing the modified clamp assembly in an assembled position.

DESCRIPTION OF THE PREFERRED EMBODIMENTS

Referring to the drawings in general and to FIG. 1 in particular, shown therein and designated by the general reference numeral 10 is an animal head gate constructed in accordance with the present invention. In general, an animal such as a cow for example is positioned so that a portion of the animal is disposed in a portion of the animal head gate 10 and the animal head gate 10 is positioned about a portion of the animal generally about a portion of the animal's neck for example to restrain movement of the animal.

The animal head gate 10 includes a frame 12 having a base 14. The base 14 has a first side 16 and a second side 18. The frame 12 has an upper end 20 and a lower end 22.

A first rod 24 is pivotally supported on the frame 12 for rotational movement in a closing direction 26 and an opposite opening direction 28. The first rod 24 has a first end 30 and a second end 32. The first end 30 of the first rod 24 is pivotally supported on the base 14 near the first side 16 of the base 14. More particularly, the first end 30 of the first rod 24 is pivotally supported in a cup 34 secured to the base 14 and extends through a sleeve 36 which is connected to the frame 12. The first rod 24 extends a distance upwardly from the base 14 to a position near the upper end 20 of the frame 12.

A second rod 38 is pivotally supported on the frame 12 for rotational movement in a closing direction 40 and an opposite opening direction 42. The second rod 38 has a first end 41 and a second end 43. The first end 41 of the second rod 38 is pivotally supported on the base 14 near the second side 18 of the base 14. More particularly, the first end 41 of the second rod 38 is pivotally supported in a cup 44 secured to the base 14 and extends through a sleeve 46 which is connected to the frame 12. The second rod 38 extends a distance upwardly from the base 14 to a position near the upper end 20 of the frame 12.

The closing direction 40 is in an opposite direction with respect to the closing direction 26. The opening direction 42 is in an opposite direction with respect to the opening direction 28.

A bar 48 is connected to the first rod 24. The bar 48 extends a distance outwardly from the first rod 24. The bar 48 is adapted to the grip by an operator and moved for rotating the first rod 24 in the closing direction 26 and in the opposite opening direction 28.

An actuator assembly 50 is connected to the first rod 24 and the second rod 38 for rotating the second rod 38 in the closing direction 40 in response to the first rod 24 being rotated in the closing direction 26. The actuator assembly 50 also is adapted to rotate the second rod 38 in the opening direction 42 in response to the first rod 24 being rotated in the opening direction 28.

A first gate 52 (FIG. 1) is connected to the first rod 24. The first gate 52 has an opened position and a closed position (FIG. 1). A portion 54 of the first gate 52 is shaped to extend about a portion of the animal when the animal is positioned in the animal head gate 10 generally between the first and the second rods 24 and 38 and in the closed position of the first gate 52.

A second gate 56 is connected to the first rod 24. The second gate 56 has an opened position and a closed position (FIG. 1). A portion 58 of the second gate 56 is shaped to extend about a portion of the animal when the animal is positioned in the animal head gate 10 generally between the first and the second rods 24 and 38 and in the closed position of the second gate 56.

In operation, the animal is positioned in the animal head gate 10 generally between the first rod 24 and the second rod 38 in the opened position of the first and the second gates 52 and 56. The operator then grips the bar 48 and moves the first rod 24 in the closing direction 26. In response to the first rod 24 being moved in the closing direction 26, the actuator assembly 50 rotates the second rod 38 in the closing direction 40. The rotation of the first and the second rods 24 and 38 in the closing directions 26 and 40, respectively, results in the movement of the first gate 52 and the second gate 56 in the closing directions 26 and 40, respectively, thereby moving the first and the second gates 52 and 56 to the closed position. In the closed position of the first and the second gates 52 and 56, the portions 54 and 58 of the first and the second gates 52 and 56 surround a portion of the animal for substantially restraining the animal. For example, the portions 54 and 58 surround a portion of a cow's neck for substantially restraining the cow.

When it is desired to release the cow, the operator grips the bar 48 and moves the bar 48 to rotate the first rod 24 in the opening direction 28. The actuator assembly 50 causes the second rod 38 to be rotated in the opening direction 42 in response to the first rod 24 being rotated in the opening direction 28 thereby moving the first and the second gates 52 and 56 to the opened position. In the opened position of the first and the second gates 52 and 56, the gates 52 and 56 do not engage the animal and the animal is unrestrained and the animal can be moved out of the animal head gate 10.

When the first gate 52 is moved in the closing direction 26, the first gate 52 is moved generally toward the second gate 56. When the second gate 56 is moved in the closing direction 40, the second gate 56 is moved generally toward the first gate 52. By the same token, when the first gate 52 is moved in the opening direction 28, the first gate 52 is moved generally away from the second gate 56 and, when the second gate 56 is moved in the opening direction 42, the second gate 56 is moved generally away from the first gate 52. In the closed position of the first and the second gates 52 and 56, the portion 54 of the first gate 52 is disposed near the portion 58 of the second gate 56 and the first gate 52 is substantially aligned and extending in a common plane with the second gate 56.

The actuator assembly 50, as shown more clearly in FIGS. 2 and 3, comprises a first pulley wheel 60, a second pulley wheel 62, a first strap 64 a second strap 66, a first adjustable clamp assembly 68 (FIGS. 3 and 8), a second adjustable clamp assembly 70 (FIGS. 1, 2, 3 and 7), a third adjustable clamp assembly 72 (FIGS. 3 and 7) and a fourth adjustable clamp assembly 74 (FIGS. 1, 2, 3 and 8). The actuator assembly 50 is disposed near the upper end 20 of the frame 12 and is connected to the second ends 32 and 43 of the first and the second rods 24 and 38, respectively.

The first pulley wheel 60 is connected to the second end 32 of the first rod 24. The first pulley wheel 60 thus is rotated in the closing direction 26 when the first rod 24 is rotated in the closing direction 26 and the first pulley wheel 60 is rotated in the opening direction 28 when the first rod 24 is rotated in the opening direction 28. The first pulley wheel 60 has an upper track 80 (FIG. 2) and a lower track 82 (FIG. 2) separated by a spacer 84 (FIG. 2).

The second pulley wheel 62 is connected to the second end 43 of the second rod 38. The second pulley wheel 62 thus is rotated in the closing direction 40 when the second rod 38 is rotated in the closing direction 40 and the second pulley wheel 62 is rotated in the opening direction 42 when the second rod 38 is rotated in the opening direction 42. The second pulley wheel 62 has an upper track 86 (FIG. 2) and a lower track 88 (FIG. 2) separated by a spacer 90 (FIG. 2).

The first and the second adjustable clamp assemblies 68 and 70 each are connected to the first pulley wheel 60. The third and the fourth adjustable clamp assemblies 72 and 74 each are connected to the second pulley wheel 62.

As shown more clearly in FIG. 8, the first strap 64 has a first end 92 and a second end 94. As shown more clearly in FIG. 7, the second strap 66 has a first end 96 and a second end 98.

A portion of the first strap 64 near the first end 92 thereof extends a distance about the first pulley wheel 60 generally in the closing direction 26 and a portion of the first strap 64 near the first end 92 thereof is adjustably secured in the first adjustable clamp assembly 68. The portion of the first strap 64 near the first end 92 thereof extending about the first pulley wheel 60 more particularly is disposed in the lower track 82.

A portion of the first strap 64 near the second end 94 thereof extends a distance about the second pulley wheel 62 generally in the opening direction 42 and a portion of the first strap 64 near the second end 94 thereof is adjustably secured in the fourth clamp assembly 74. The portion of the first strap 64 near the second end 94 thereof more particularly is disposed in the lower track 88 of the second pulley wheel 62.

A portion of the second strap 66 near the first end 96 thereof extends a distance about the first pulley wheel 60 in the opening direction 28 and a portion of the second strap 66 near the first end 96 thereof is adjustably secured or connected to the second adjustable clamp assembly 70. The portion of the second strap 66 near the end 96 thereof extending about the first pulley wheel 60 more particularly is disposed in the upper track 80 of the first pulley wheel 60.

A portion of the second strap 66 near the second end 98 thereof extends a distance about the second pulley wheel 62 generally in the closing direction 40 and a portion of the second strap 66 near the second end thereof is adjustably secured in the third adjustable clamp assembly 72. A portion of the second strap 66 near the second end 98 thereof more particularly is disposed in the upper track 86 of the second pulley wheel 62.

When the first rod 24 is rotated in the closing direction 26, the first pulley wheel 60 is rotated in the closing direction 26 thereby causing the first strap 64 be pulled in a direction 100 (FIG. 8) thereby pullingly rotating the second pulley wheel 62 for rotating the second rod 24 in the closing direction 40. When the first rod 24 is rotated in the opening direction 28, the first pulley wheel 60 is rotated in the opening direction 28 thereby causing the second strap 66 to be pulled in a direction 102 causing the second pulley wheel 62 to be rotated in the opening direction 42.

The first and the second straps 64 and 66 are similar in construction. The first and the second straps 64 and 66 each have a square or rectangular shaped cross section. The first and the second strap 64 and 66 each have a width 104 (shown in FIG. 2 with respect to the first strap 64) and a thickness 106 (shown in FIG. 2 with respect to the second strap 66).

The first strap 64 has a length extending between the first and the second ends 92 and 94 thereof. The second strap 66 has a length extending between the first and the second ends 96 and 98 thereof.

The width 104 of each of the straps 64 and 66 has at least two times the thickness of the respective straps 64 and 66. The first and the second straps 64 and 66 each have a substantially flat upper surface 108 (shown in FIG. 8 with respect to the first strap 64) and a substantially flat lower surface 110 (shown in FIG. 8 with respect to the first strap 64). The first and the second straps 64 and 66 comprise a plurality of individual strands woven and interconnected to form the respective straps 64 and 66. The individual strands are constructed of a metal or plastic. The individual straps 64 and 66 each preferably are constructed of a Kevlar ® material.

The first, the second, the third and the fourth adjustable clamp assemblies 68, 70, 72 and 74 are identical in construction and operation. A typical clamp assembly 68, 70, 72 or 74 is shown in more detail in FIGS. 4, 5 and 6.

Clamp assemblies 68, 70, 72 and 74 each include an upper plate 112 and a lower plate 114. A first clamp rod 116 is connected to the upper plate 112 and the lower plate 114. A second clamp rod 118 also is connected to the upper plate 112 and the lower plate 114. The first clamp rod 116 is spaced a distance from the second clamp rod 118. An opening 120 (FIG. 4) is formed through the upper plate and an opening 122 (FIG. 4) is formed through the lower plate 114. A third clamp rod 124 is rotatingly disposed through the openings 120 and 122.

An upper brace 126 is secured to the first or second pulley wheel 60 or 62 and a lower brace 128 is secured to a portion of the first or the second pulley wheel 60 or 62. The rod assembly comprising the first clamp rod 116, the second clamp rod 118 and the third clamp rod 124 (prior to the third clamp rod 124 being inserted therein) is disposed between the upper brace 126 and the lower brace 128. The third clamp rod 124 then is disposed through openings in the upper and the lower braces 126 and through the openings 120 and 122 in the upper and lower plates 112 and 114 whereby the clamp assembly 68 or 70 or 72 or 74 is rotatable about the third clamp rod 124. A lock nut 130 is disposed on one end of the clamp rod 124 and a lock nut 132 is disposed on the opposite end of the third clamp rod 124. When the rod assembly has been rotated to the proper position, the lock nuts 130 and 132 are threadedly moved about the third clamp rod 140 for clampingly engaging the respective upper and lower braces 126 and 128 thereby substantially preventing the rotation of the rod assembly.

One end of the first or the second strap 64 or 66 is disposed about the first clamp rod 116 and extended over and around the third clamp rod 124 and then extended over and around the first clamp rod 116 under the portion of the strap 64 or 66 initially extended about the first clamp rod 116. The strap 64 or 66 then is pulled to tighten the strap 64 or 66 around the first and the third clamp rods 116 and 124. The first strap 64 is connected to the first clamp assembly 68 and the fourth clamp assembly 74 in the manner just described and the second strap 66 is connected to the second clamp assembly 70 and the third clamp assembly 72 in the manner just described.

After the straps 64 and 66 have been connected to the respective clamp assemblies 68, 70, 72 and 74 in the manner just described, the lock nuts 130 and 132 on the first and the second clamp assemblies 68 and 70 are loosened so the first and the second clamp assemblies 68 and 70 can be rotated. The first and the second clamp assemblies 68 and 70 then are rotated to pull the first and the second straps 64 and 66 respectively and place a predetermined tension in the first and the second straps 64 and 66. After the proper tension has been placed in the straps 64 and 66, the lock nuts 130 and 132 on the first and the second clamp assemblies 68 and 70 then are tightened to secure the first and the second clamp assemblies 68 and 70 in a non rotatable, secure position. In the alternative, the third and the fourth clamp assemblies 72 and 74 may be rotated in the manner just described to place the proper or predetermined tension in the straps 64 and 66.

In an alternate embodiment, a loop 150 (FIGS. 9 and 10) may be sewn in the second ends 94 and 98 of the respective first and second straps 64 and 66. The third clamp rod 124 is disposed through the opening in the upper brace 126 and through the opening 120 in the upper plate 122 and through the loop 150 in the first or the second strap 64 and 66. The third clamp rod 124 then is disposed through the opening 122 and the opening in the lower brace 128. The lock nuts 130 and 132 then are secured to the third clamp rod 124. After the second ends 94 and 96 of the first and the second straps 64 and 66 are secured to the third and the fourth clamp assemblies 72 and 74 in the manner just described, the first ends 92 and 96 of the first and the second straps 64 and 66 are disposed about the first and the second clamp assemblies 68 and 70 in the manner described in detail before. The first and the second clamp assemblies 68 and 70 then are rotated to adjust the tension in the first and the second straps 64 and 66 and locked in the non-rotatable position via the lock nuts 130 and 132 in a manner like that described before.

In the embodiment shown in FIGS. 9 and 10, the first and the second clamp rods 116 and 118 are not necessary and may be eliminated if so desired. Also, a loop might be placed in the opposite end of the straps 64 and 66 (opposite the end having the loop 150 shown in FIGS. 9 and 10) and, in this instance, the loop would be connected to the first and the second clamp assemblies 68 and 70 in the manner just described in connection with the clamp assembly 72 and 74 in the embodiment shown in FIGS. 9 and 10. In this last mentioned embodiment, the first and the second clamp rods 116 and 118 also could be eliminated. With this last-mentioned embodiment, some of the adjustability is lost when the loops are placed in both of the ends of the straps 64 and 66 and it becomes more important that the straps 64 and 66 have predetermined lengths.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. An animal head gate for restraining an animal, comprising:
   a base;
   a first rod pivotally supported on the base and extending a distance upwardly from the base;
   a second rod pivotally supported on the base and extending a distance upwardly from the base, the second rod being spaced a distance from the first rod;
   a first gate having an opened position and a closed position, the first gate being connected to the first rod and a portion of the first gate extending about at least a portion of the animal in the closed position of the first gate;
   a second gate having an opened position and a closed position, the second gate being connected to the second rod, and a portion of the second gate extending about at least a portion of the animal in the closed position of the second gate, the first and the second gates extending about portions of the animal for substantially restraining the animal in the closed positions of the first and the second gates;

means for rotatingly moving the first rod in a closing direction for moving the first gate connected to the first rod to the closed position and for moving the first rod in an opening direction for moving the first gate connected to the first rod to the opened position; and an actuator assembly connected to the first rod and the second rod for rotating the second rod in a closing direction thereby moving the second gate connected to the second rod in the closing direction for moving the second gate to the closed position in response to the first rod being rotated in a closing direction, and for rotating the second rod in an opening direction thereby moving the second gate connected to the second rod in the opening direction for moving the second gate to the opened position in response to the first rod being rotated in the opening direction, the actuator assembly comprising:

strap means for connecting the first rod to the second rod so that the first and second gates are selectively movable between the opened and closed positions, the strap means comprising at least one strap consisting of a plurality of individual strands woven and interconnected.

2. The animal head gate of claim 1 wherein the strands are defined further as being constructed of a metal or plastic.

3. An improvement in an animal head gate wherein the animal head gate comprises a base, a first rod pivotally supported on the base having a first gate connected thereto, a second rod pivotally supported on the base having a second gate connected thereto, the first gate having an opened position and a closed position and the second gate having an open position and a closed position, and means for rotatingly moving the first rod in a closing direction for moving the first gate connected to the first rod to the closed position and for moving the first rod in an opening direction for moving the first gate connected to the first rod to the opened position, the improvement comprising:

an actuator assembly connected to the first rod and the second rod for rotating the second rod in a closing direction thereby moving the second gate connected to the second rod in the closing direction for moving the second gate to the closed position in response to the first rod being rotated in a closing direction, and for rotating a second rod in an opening direction thereby moving the second gate connected to the second rod in the opening direction for moving the second gate to the opened position in response to the first rod being rotated in the opening direction, the actuator assembly comprising:

a strap having a square or rectangular shaped cross section and having a width and a thickness, the width of the strap being at least two times the thickness of the strap and the strap having a substantially flat upper surface and a substantially flat lower surface, the strap comprising a plurality of individual strands woven and interconnected, the strap connected to the first and second rods such that the first and second rods can be rotated by the strap to move the first and second gates between the opened and closed positions.

4. The animal head gate of claim 3 wherein the strands are defined further as being constructed of a metal or plastic.

5. An animal head gate for restraining an animal, comprising:

a base;

a first rod pivotally supported on the base and extending a distance upwardly from the base;

a second rod pivotally supported on the base and extending a distance upwardly from the base, the second rod being spaced a distance from the first rod;

a first gate having an opened position and a closed position, the first gate being connected to the first rod and a portion of the first gate extending about at least a portion of the animal in the closed position of the first gate;

a second gate having an opened position and a closed position, the second gate being connected to the second rod, and a portion of the second gate extending about at least a portion of the animal in the closed position of the second gate, the first and the second gates extending about portions of the animal for substantially restraining the animal in the closed positions of the first and the second gates;

means for rotatingly moving the first rod in a closing direction for moving the first gate connected to the first rod to the closed position and for moving the first rod in an opening direction for moving the first gate connected to the first rod to the opened position; and an actuator assembly connected to the first rod and the second rod for rotating the second rod in a closing direction thereby moving the second gate connected to the second rod in the closing direction for moving the second gate to the closed position in response to the first rod being rotated in a closing direction, and for rotating a second rod in an opening direction thereby moving the second gate connected to the second rod in the opening direction for moving the second gate to the opened position in response to the first rod being rotated in the opening direction, the actuator assembly comprising:

a first pulley wheel connected to the second end of the first rod;

a second pulley wheel connected to the second end of the second rod;

a first strap having a first end and a second end, the first end of the first strap being connected to the first pulley wheel and the second end of the first strap being connected to the second pulley wheel, the first strap having a square or rectangular shaped cross section and having a width and a thickness, the width of the first strap being at least two times the thickness of the first strap and the first strap having a substantially flat upper surface and a substantially flat lower surface, the first strap comprising a plurality of individual strands woven and interconnected to form the first strap; and a second strap having a first end and a second end, the first end of the first strap being connected to the first pulley wheel and the second end of the second strap being connected to the second pulley wheel, the second strap having a square or rectangular shaped cross section and having a width and a thickness, the width of the second strap being at least two times the thickness of the second strap and the second strap having a substantially flat upper surface and a substantially flat lower surface, the second strap comprising a plurality of individual strands woven and interconnected to form the second strap.

6. The animal head gate of claim 5 wherein a portion of the first strap near the first end thereof extends about a portion of the first pulley wheel in one direction and a portion of the first strap near the second end thereof extends about the second pulley wheel in an opposite direction, the rotating of the first pulley wheel in the closing direction rotating the second pulley wheel in the closing direction, opposite the closing direction of the first pulley wheel, and wherein a portion of the second strap near the first end thereof extends about a portion of the first pulley wheel in one direction and a portion of the second strap near the second end thereof extends about the second pulley wheel in an opposite direction, the rotating of the first pulley wheel in the opening direction rotating the second pulley wheel in the opening direction, opposite the opening direction of the first pulley wheel.

7. The animal head gate of claim 5 wherein the strands in the first strap are defined further as being constructed of a metal or plastic, and wherein the strands in the second strap are defined further as being constructed of a metal or plastic.

8. The animal head gate of claim 5 wherein the actuator assembly further comprises:
a first clamp assembly connected to the first pulley wheel, comprising:
an upper plate;
a lower plate;
a rod assembly disposed between the upper and the lower plates; and
means for connecting the rod assembly to the upper plate and the lower plate, said means having one position for permitting the rod assembly to rotate and another position for securing the rod assembly to the upper and the lower plates for substantially preventing rotation of the rod assembly, a portion of the first strap near the first end thereof being extended about a portion of the rod assembly for connecting the portion of the first strap to the rod assembly, the rod assembly being rotatable in the one position of said means for adjusting the tension in the first strap.

9. The head gate assembly of claim 8 wherein the actuator assembly further comprises:
a second clamp assembly connected to the first pulley wheel, comprising:
an upper plate;
a lower plate;
a rod assembly disposed between the upper and the lower plates; and
means for connecting the rod assembly to the upper plate and the lower plate, said means having one position for permitting the rod assembly to rotate and another position for securing the rod assembly to the upper and the lower plates for substantially preventing rotation of the rod assembly, a portion of the second strap near the first end thereof being extended about a portion of the rod assembly for connecting the portion of the second strap to the rod assembly, the rod assembly being rotatable in the one position of said means for adjusting the tension in the second strap.

10. The animal head gate of claim 9 wherein the actuator assembly further comprises:
a third clamp assembly connected to the second pulley wheel, comprising:
an upper plate;
a lower plate;
a rod assembly disposed between the upper and the lower plates; and
means for connecting the rod assembly to the upper plate and the lower plate, said means having one position for permitting the rod assembly to rotate and another position for securing the rod assembly to the upper and the lower plates for substantially preventing rotation of the rod assembly, a portion of the first strap near the second end thereof being extended about a portion of the rod assembly for connecting the portion of the first strap to the rod assembly, the rod assembly being rotatable in the one position of said means for adjusting the tension in the first strap.

11. The animal head gate assembly of claim 10 wherein the actuator assembly further comprises:
a fourth clamp assembly connected to the second pulley wheel, comprising:
an upper plate;
a lower plate;
a rod assembly disposed between the upper and the lower plates; and
means for connecting the rod assembly to the upper plate and the lower plate, said means having one position for permitting the rod assembly to rotate and another position for securing the rod assembly to the upper and the lower plates for substantially preventing rotation of the rod assembly, a portion of the second strap near the second end thereof being extended about a portion of the rod assembly for connecting the portion of the second strap to the rod assembly, the rod assembly being rotatable in the one position of said means for adjusting the tension in the second strap.

12. The animal head gate assembly of claim 9 wherein the actuator assembly further comprises:
a third clamp assembly connected to the second pulley wheel comprising:
a rod assembly connected to the second pulley wheel, a portion of the first strap near the second thereof being connected to the rod assembly.

13. The animal head gate of claim 12 wherein the actuator assembly further comprises:
a fourth clamp assembly connected to the second pulley wheel, comprising:
a rod assembly connected to the second pulley wheel, a portion of the second strap near the second thereof being connected to the rod assembly.

* * * * *

UNITED STATES PATENT AND TRADEMARK OFFICE
CERTIFICATE OF CORRECTION

PATENT NO. : 5,375,560

DATED : December 27, 1994

INVENTOR(S) : Paul et al.

It is certified that error appears in the above-identified patent and that said Letters Patent is hereby corrected as shown below:

Column 4, line 25, please delete "end 96" and substitute therefor -- first end 96 --.

Column 4, line 39, after "first strap 64" please insert -- to --.

Column 4, lines 41-42, please delete "second rod 24" and substitute therefor -- second rod 38 --.

Column 5, line 29, please delete "braces 126" and substitute therefor -- braces 126 and 128 --.

Column 5, line 37, please delete "third clamp rod 140" and substitute therefor -- third clamp rod 124 --.

Column 6, line 9, please delete "upper plate 122" and substitute therefor -- upper plate 112 --.

Column 6, line 14, please delete "second ends 94 and 96" and substitute therefor -- second ends 94 and 98 --.

Column 6, line 33, please delete "assembly 72 and 74" and substitute therefor -- assemblies 72 and 74 --.

Column 10, line 54, after the word "second" please insert -- end --.

UNITED STATES PATENT AND TRADEMARK OFFICE
CERTIFICATE OF CORRECTION

PATENT NO. : 5,375,560

DATED : December 27, 1994

INVENTOR(S) : Paul et al.

It is certified that error appears in the above-indentified patent and that said Letters Patent is hereby corrected as shown below:

Column 10, line 62, after the word "second" please insert —end—.

Signed and Sealed this

Twenty-third Day of May, 1995

Attest:

BRUCE LEHMAN

*Attesting Officer*     *Commissioner of Patents and Trademarks*